Nov. 28, 1967  E. BALLS  3,354,878
PORTABLE RANGES
Filed Dec. 22, 1965  2 Sheets-Sheet 1
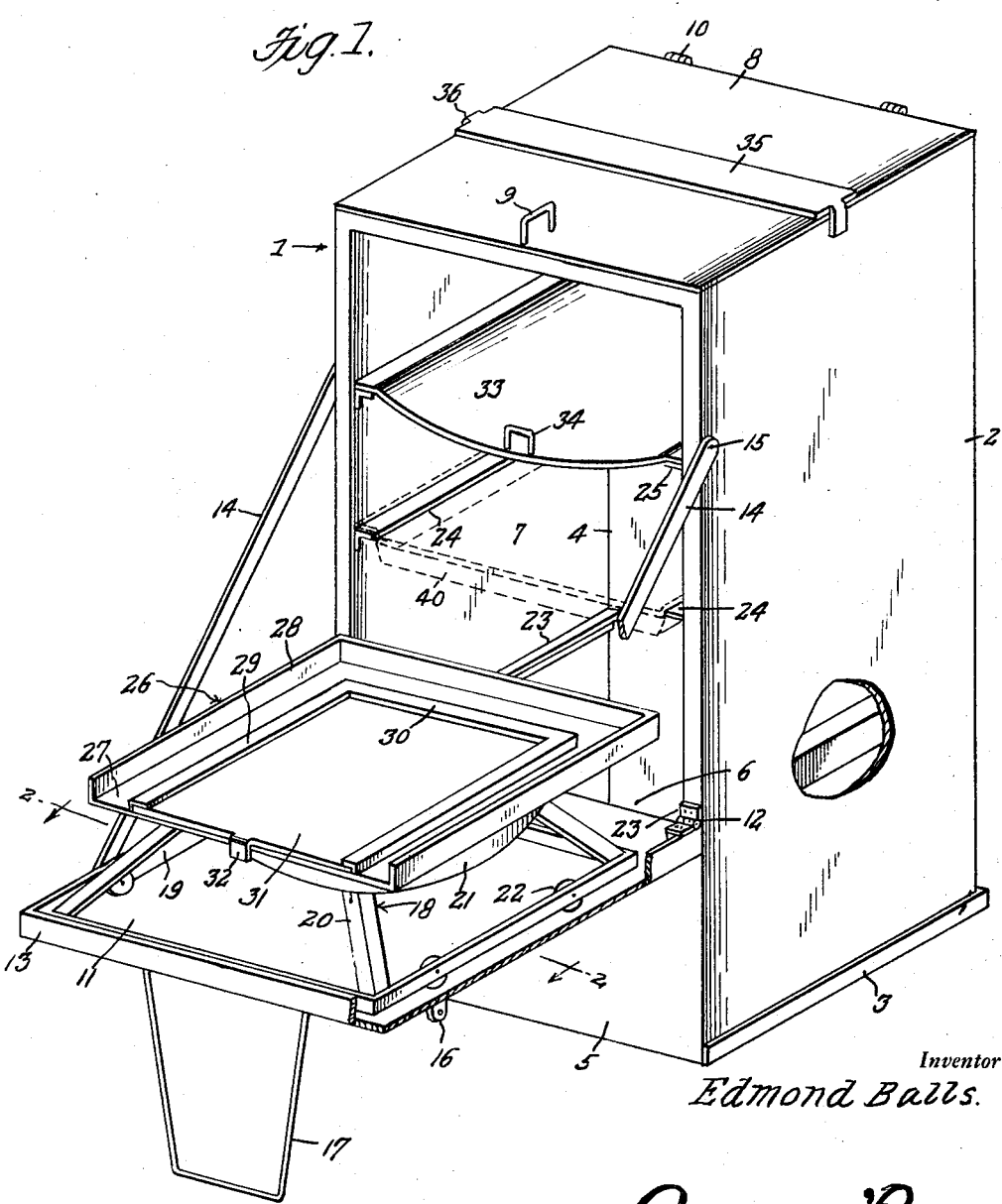
Inventor
*Edmond Balls.*
By *Clarence A. O'Brien
and Harvey B. Jacobson*
Attorneys Nov. 28, 1967 — E. BALLS — 3,354,878
PORTABLE RANGES
Filed Dec. 22, 1965 — 2 Sheets-Sheet 2
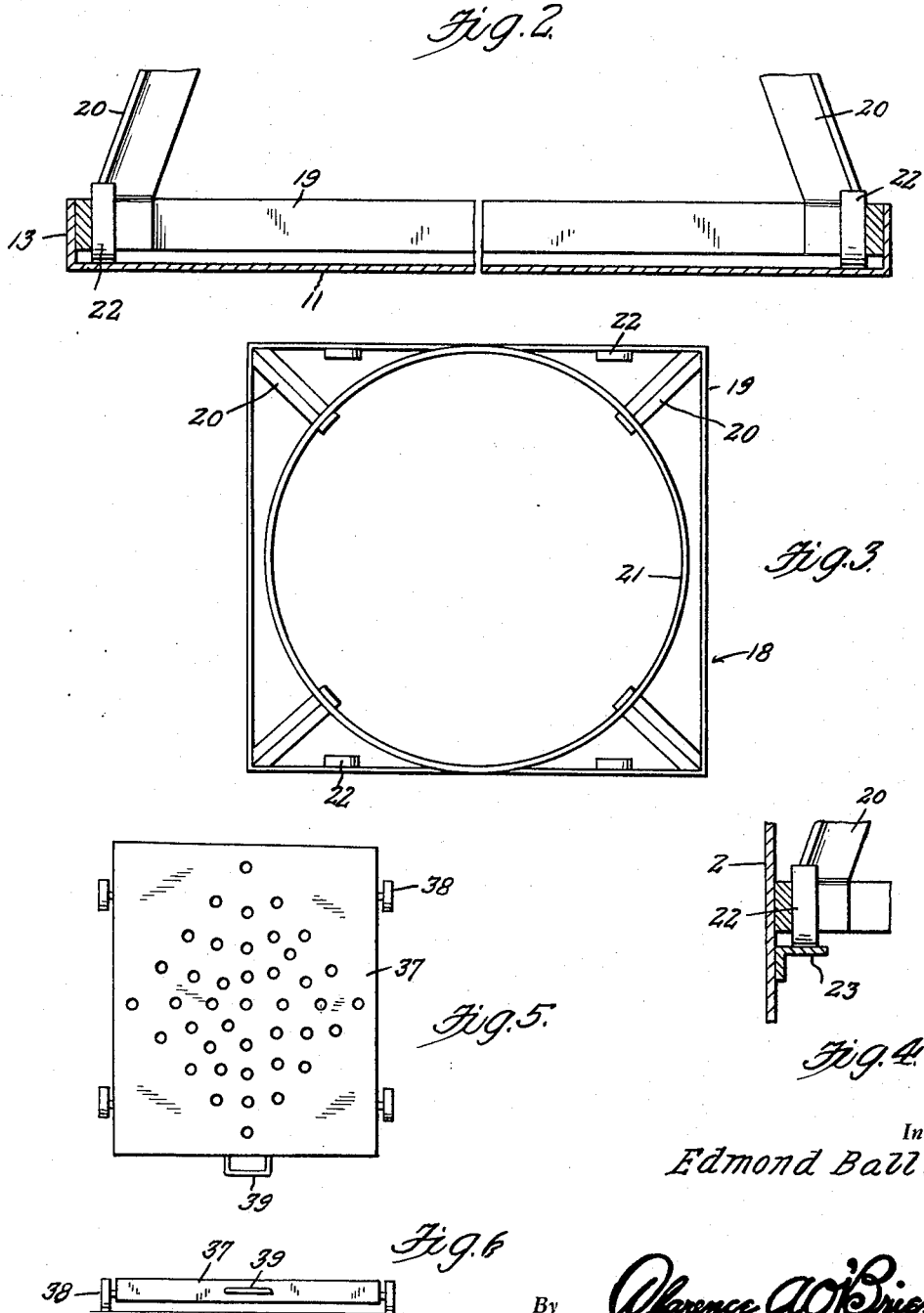
Inventor
Edmond Balls

United States Patent Office 3,354,878
Patented Nov. 28, 1967

3,354,878
PORTABLE RANGES
Edmond Balls, 1747 Church St. NW.,
Washington, D.C. 20036
Substituted for abandoned application Ser. No. 670,981, May 20, 1946. This application Dec. 22, 1965, Ser. No. 544,037
2 Claims. (Cl. 126—275)

ABSTRACT OF THE DISCLOSURE

Portable oven apparatus having a false oven bottom removably mounted on a roller supported cradle assembly. The cradle assembly is adapted to be rolled out of the oven and into the oven door when the oven door is in its opened position. The false oven bottom is formed of superposed solid plates one of which is removable to reduce the thickness of the oven bottom.

---

My invention relates to improvements in portable cabinet ranges of the type designed for use in the field, and particularly in army camps, and the like.

The invention is designed with the primary object in view of providing such ranges with inexpensive, efficient oven equipment for evenly distributing the heat to cooking either close to or remote from the source of heat, and adapting the range for slow or quick cooking, as desired, in different sizes of pots, pans, and the like.

Another object is to provide in such ranges efficient means for preventing the escape of heat out of the top of the oven.

Still another object is to provide equipment for the purposes above set forth which is easy to handle and maintain clean and sanitary.

Other objects also comprehended by my invention, together with the precise nature of my improvements, and the advantages thereof, will be readily understood when the succeeding description and claims are read with reference to the drawings accompanying and forming part of this specification.

In said drawings:

FIGURE 1 is a view in perspective partly broken away of a portable cabinet range equipped with my improvements, in the preferred embodiment thereof.

FIGURE 2 is a view in transverse section taken on the line 2—2 of FIGURE 1, and drawn to a larger scale.

FIGURE 3 is a view in plan of the pot cradle,

FIGURE 4 is a detailed view in vertical transverse section showing the manner in which the pot cradle is supported by the lower rack bars.

FIGURE 5 is a view in plan of the shelf, and

FIGURE 6 is a view in front and elevation of the same.

FIGURE 7 is a view in transverse section of the false oven bottom.

Reference being had to the drawings by numerals, my improvements have been shown therein as embodied in a range comprising an elongated, rectangular, sheet steel cabinet 1 designed to seat in up-ended position on the ground, or the like, and having side panels 2, a bottom panel 3, and a back panel 4. A lower, front panel 5 forms, together with the panels 2, 3 and 4, a bottom firebox 6 in said cabinet 1 for containing burners or a fire grate, not shown, since the same form, per se, no part of the present invention. Above the firebox 6, the cabinet 1 forms an oven 7 having an open front and an open top.

A lid 8 having a handle 9 is hinged, as at 10, to the back panel 4 for closing and opening the top of the oven 7.

A tray-like, rectangular, front door 11 is hinged at its lower edge, as at 12, to the front edges of the panels 2, in line with the top edge of the lower front panel 5 for opening and closing the front of the oven 7. The door 11 is designed to open downwardly and outwardly to dispose the same in a horizontal plane just above the top of the fire-box 6, and is formed with a right-angled flange 13 along its side and top edges, for a purpose presently seen.

A pair of brace bars 14 pivoted at the upper ends thereof, as at 15, to the side panels 2 and adapted by suitable means, not shown, to couple to apertured ears, as at 16, on said door 11 support said door 11 when the same is opened. A bail 17 on said door 11, adapted to engage the ground, further supports the door 11, when opened, and serves as a door handle.

A pot cradle 18 is provided for use in the oven 7 and comprises a rectangular, skeleton, base frame 19 of a size to fit in the door 11, when said door is opened, and also in the oven 7, said frame being provided with corner uprights 20 converging upwardly from said frame and having an annular band 21 suitably fixed to the upper ends thereof, said band being of substantially the same diameter as the width of the frame 19, or, in other words, as the width of the oven 7. Pairs of rollers 22 on the sides of the frame 19 provide for supporting the pot cradle on the door 11 within the flange 13, and for rolling said cradle 13 off said door into the oven 7. As will be understood, the band 21 is designed to support a pot, of a given size, not shown, inserted in the band and to suspend a pot in said cradle.

Pairs of opposed, horizontal rack bars are provided in the oven 7, on the side panels 2, there being, as shown, a lower pair 23, at the top of the firebox 6, and with which the door 11 is aligned when opened, for rolling of said pot cradle 18 off the door 11 onto said bars, and also an intermediate pair of such bars 24 and a top pair 25 for a purpose presently apparent.

It may be stated, at this point, that the intermediate and top pair of rack bars 24, 25 may be used to support, at fixed levels, roasting pans, not shown, of a width to fit in the oven 7 and on said bars. All of the bars 23, 24, 25 are constructed and arranged so that such pans, or similar devices, may be slid into the oven 7 along said bars.

Returning now to the pot cradle 18, it is to be noted that this cradle is so proportioned that the band 21 suspends pots intermediate the lower and intermediate pairs of rack bars 23, 24. A particular feature of my invention is that a false oven bottom 26 is provided for use on said cradle 18 below the intermediate pair of rack bars 24 to dampen heat from the firebox 6 and evenly distribute such heat to food being cooked in the oven 7 above said bottom.

The false oven bottom 26 comprises a rectangular plate 27 fitting, with the requisite clearance, in the oven 7 and between the side panels 2, and being provided with an upstanding flange 28 around the side and rear edges thereof forming said plate into a tray with an open front. Guide bars 29 on said plate 27 extend from the front edge thereof forwardly, at opposite sides of said plate, to a similar connecting rear, cross-bar 30 on the plate. A removable panel 31 is slidably fitted in said guide and cross-bars 29, 30 with a front edge hand-grip tab 32 thereon. The panel 31 is formed of suitable metal and renders the plate 27 of double thickness.

The false oven bottom described in the foregoing may be placed on the band 21 of the pot cradle 18 to be moved by said cradle into the oven 7 without, or with cooking utensils thereon. Primarily, said false bottom 26 is designed for use without cooking utensils thereon and when a roasting pan, as shown at 40 in dotted lines in FIGURE 1, is placed on the intermediate pair of rack bars 24, the purpose being to baffle heat arising from the firebox 6 and cause such heat to spread and to evenly distribute it above said bottom. If desired, the false bottom 26 may be used alone on the lower pair of rack bars 23 for cooking close to the heat. By pulling the slide panel out of the guide bars 29, 30, said bottom may be reduced in thickness to facilitate the transfer of heat therethrough. As will be clear, the false bottom 26 may be used to support roasting pans, not shown, too narrow for support by the rack bars 23, 24, 25, at different levels for cooking alone to the firebox 6 or the source of heat, or at a selected distance from said source.

To complement the false bottom 26 in effecting even distribution of heat above the same, a baffle plate 33, preferably downwardly bowed, is provided for sliding on the top pair of rack bars 25 by means of a handle 34 thereon. The baffle plate 33 may be used with the lid 8 opened or closed, to prevent heat from escaping, in variable degree, out of the top of the oven 7.

A lid-retaining bar 35, with downturned, resilient end tabs 36, is provided for spanning the lid 8 and frictionally engaging the side panels 2 to prevent said lid 8 from opening and permitting heat to escape past the same.

For cooking with pots, too small to fit the band 21, a foraminous shelf plate 37 is provided, with slide rollers 38 thereon, and a handle 39. The shelf plate 37 may be rolled off the door 11, with a pot or pots thereon unto the lower pair of rack bars 33, or, disposed on the rack bars 24, 25 for simmering food in the pots. As will be clear, the baffle plate 33 is removed if it is desired to use the false bottom 26, or the shelf plate 37 on the top pair of rack bars 25.

The foregoing will, it is believed, suffice to impart a clear understanding of my invention without further explanation, since the use and operation of the parts have been set forth in connection with the description of the structure thereof.

Manifestly, the invention as described is susceptable of modification without departing from the inventive concept, and right is herein reserved to such modifications as fall within the scope of the appended claims.

What I claim is:

1. In a range of the class described, a bottom firebox, an oven above said box having an open top, an oven door above said firebox opening downwardly into a fully opened, horizontal position, pairs of opposed rack bars on the sides of said oven arranged at different levels to provide an upper, a lower and an intermediate pair with the lower pair at the level of the door when said door is fully opened, a roller-supported cradle operative from a position of rest on said door for rolling onto the lower pair of rack bars into said oven, and a false oven bottom removably mounted on said cradle for movement into said oven thereby below the intermediate pair of rack bars, the intermediate pair of rack bars being adapted to support a pan thereon, and a heat baffle plate disposed on the upper pair of rack bars to prevent the escape of heat from the top of said oven and confine the heat close to the pan, said false bottom being formed of superposed solid plates one of which is removable to reduce the thickness of said bottom and thereby reduce resistance to the passage of heat through the false bottom.

2. In a range of the class described, a bottom firebox, an oven above said box, an oven door above said firebox opening downwardly into a fully opened horizontal position, pairs of opposed rack bars on the sides of said oven arranged at different levels to provide an upper and a lower pair with the lower pair at the level of the door when said door is fully opened, a roller supported cradle operative from a position of rest on said door for rolling onto the lower pair of rack bars into said oven, and a false oven bottom mounted on said cradle for movement into said oven below the upper pair of rack bars, said upper pair of rack bars being adapted to support a pan thereon, said false bottom being formed of superposed solid plates, one removable to reduce the thickness of said bottom and thereby reduce resistance to the passage of heat through the false bottom.

References Cited

UNITED STATES PATENTS

| | | | |
|---|---|---|---|
| 1,271,309 | 7/1918 | Gross | 126—275 |
| 1,438,792 | 12/1922 | Snyder | 126—275 |

FREDERICK L. MATTESON, JR., *Primary Examiner.*

E. G. FAVORS, *Assistant Examiner.*